United States Patent [19]
Lloyd et al.

[11] Patent Number: 5,643,479
[45] Date of Patent: Jul. 1, 1997

[54] ELECTRIC ARC WELDING

[76] Inventors: Robert D. Lloyd, 2015 County Rd. 24, Marengo, Ohio 43334; Daniel B. Mitchell, 2762 Cannon Cir., Lewis Center, Ohio 43035

[21] Appl. No.: 557,277

[22] Filed: Nov. 14, 1995

[51] Int. Cl.$^6$ ..................................................... B23K 9/09
[52] U.S. Cl. .................... 219/137 PS; 219/130.51
[58] Field of Search ................. 219/130.51, 130.5, 219/137.7, 137.71, 137 PS

[56] References Cited

U.S. PATENT DOCUMENTS

| | | | |
|---|---|---|---|
| 2,079,956 | 5/1937 | Burgett | 219/137.7 |
| 3,555,239 | 1/1971 | Kerth | 219/130.5 |
| 3,995,138 | 11/1976 | Kalev et al. | 219/130.51 |
| 4,273,988 | 6/1981 | Iceland et al. | 219/130.51 |
| 4,409,465 | 10/1983 | Yamamoto et al. | 219/130.51 |
| 4,521,672 | 6/1985 | Fronius | 219/130.51 |
| 4,758,707 | 7/1988 | Ogilvie | 219/130.51 |
| 5,525,778 | 6/1996 | Matsui et al. | 219/130.51 |

*Primary Examiner*—Clifford C. Shaw
*Attorney, Agent, or Firm*—Thomas S. Baker, Jr.

[57] ABSTRACT

Methods and apparatus for the electric arc welding of metal workpieces utilize a current comprised of squared waveform high-amplitude current pulse groups alternated with squared waveform low-amplitude current pulse groups, the current pulse groups being developed or developed and algorithmically varied in response to detected welding arc voltage/current condition changes and with respect to pulse group periods, pulse group peak current amplitudes, pulse group repetition frequencies, and pulse group current rise/fall rates for particular applications.

19 Claims, 6 Drawing Sheets

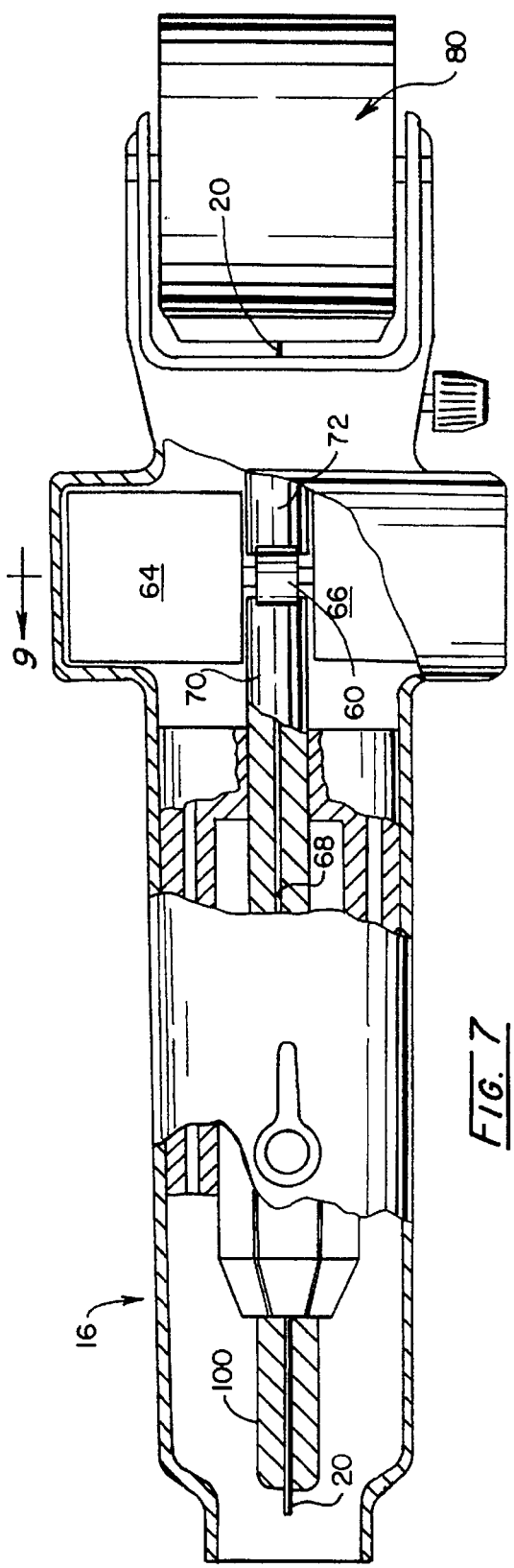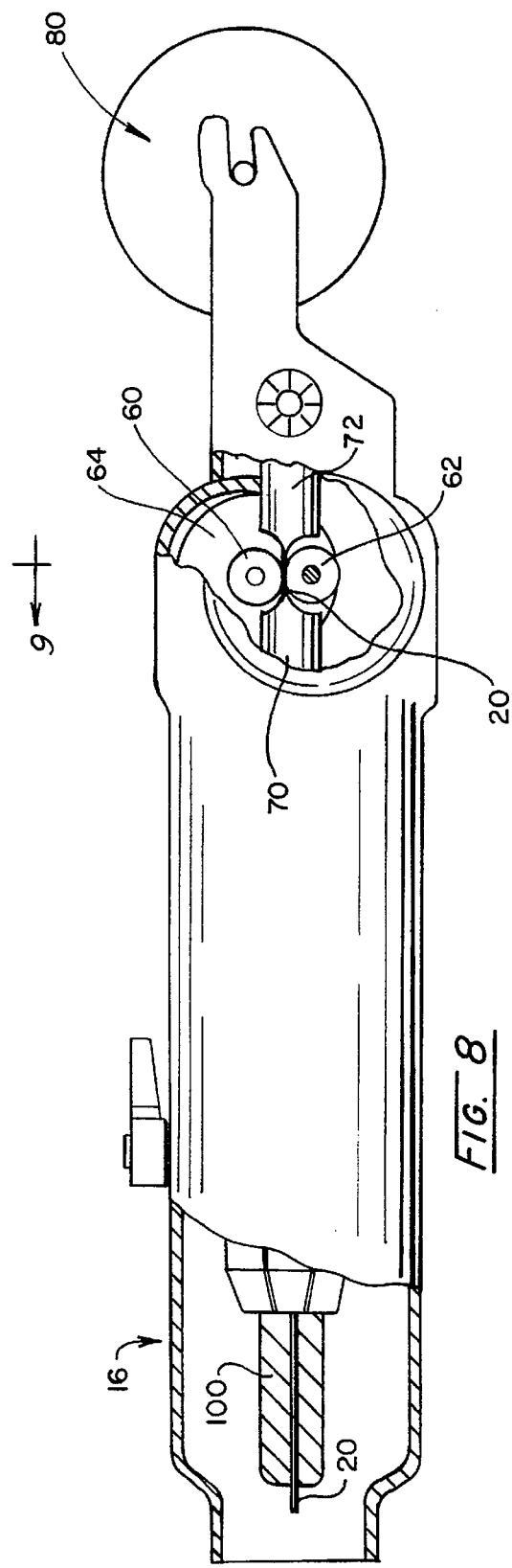

ELECTRIC ARC WELDING

CROSS-REFERENCES

None.

FIELD OF THE INVENTION

This invention relates generally to electric arc welding, and particularly concerns methods and apparatus for melting welding filler material and spray-transferring and weld-bonding the melted filler material to a metal workpiece with improved process efficiencies and improved metallurgical results.

BACKGROUND OF THE INVENTION

Numerous different gas metal arc welding (GMAW) processes have been widely utilized throughout the United States and elsewhere with metals such as cold rolled steel, stainless steel, and aluminum, nickel, copper, titanium, cobalt and their alloys. Such processes generally utilize an inert or partially-reactive gas of uniform composition for protecting or shielding the molten welding filler material and its adjacent workpiece welding site primarily from the effects of environmental oxygen and environmental nitrogen, and are satisfactory for many known welding applications. However, the known gas metal arc welding (GMAW) processes are often found to be unsatisfactory for welding particular metals. These include certain aerospace industry-utilized nickel-based super alloys, which are normally difficult-to-weld and sometimes also susceptible to metal composition degradation or micro-cracking at and near the weld bond line. The gas metal arc welding processes also have been found to be unsatisfactory for welding relatively thin metal sheet materials, for welding small, highly precise metal assemblies, and for welding at difficult-to-access metal workpiece locations.

We have discovered that many of the fabrication and metallurgical shortcomings associated with the prior art GMAW processes may be overcome by using the method steps and apparatus of the present invention. Also, other advantages of the present invention will become apparent from study of the drawings, detailed descriptions, and claims which follow.

SUMMARY OF THE INVENTION

The present invention basically involves a method wherein a unique high-frequency electric energy welding current comprised of successive pulse groups that each have an extremely squared waveform is conducted through both a continuously advancing welding wire electrode and the metal workpieces that are to be joined by the welding process. The uniquely pulsed electric welding current causes the filler material of the advancing welding wire to be melted, spray-transferred, and weld-bonded to the metal parts being joined with minimal energy requirements and therefore with a minimum penetration of otherwise undesired heat into the to-be-joined metal components. Such objectives are achieved at least in-part because, in comparison to other known spray-transfer welding procedures, a significantly shortened arc length is obtained, and increased welding arc voltage and current stability becomes a consequential control result.

The unique electric arc welding current is further characterized as having a squared waveform that is formed by successively alternating an extremely stable group of high-frequency, high-amplitude electric current pulses having a short pulse group time duration with an extremely stable group of high-frequency, low-amplitude electric current pulses having a pulse group time duration that is significantly greater (longer) than the time duration of the high-frequency, high-amplitude current pulse group. The time durations and the peak current amplitudes of the high-amplitude and of the low-amplitude welding current pulse groups, i.e., the welding current waveform pulses, are advantageously varied in some applications from time to time as a function of detected changes in the voltage/current condition of the welding arc. The repetition frequencies of the welding current squared waveform high-amplitude and low-amplitude pulse groups, and the current amplitude levels of such pulse groups also are advantageously varied in some applications as a function of the same detected welding arc condition changes. Particular pulsed electric welding current characteristics pertaining to squared waveform current pulse group rise/fall rates, range of squared waveform pulse group repetition frequencies, and current pulse group current amplitude ranges are preferred for optimum method efficiencies and effectiveness in particular applications of the invention.

From an apparatus standpoint, the present invention also basically involves a novel welding system electric power supply unit having a high-frequency power regulator section that functions to generate the desired unique pulsed electric welding current in a constant voltage operating mode consonant with a welding wire filler material electrode that is continually being advanced or fed toward the process metal workpiece. When controlled variation or changing of process squared waveform electric welding current parameters is desired, the apparatus high-frequency power regulator section includes circuitry having a control loop that detects changing voltage/current conditions in the system electric welding arc. The feedback signals that are generated are processed to change the waveform pulse group current amplitudes and pulse group time durations (current waveform pulse group widths) of the electric welding current actually being conducted through the welding wire filler material and the workpiece. The pulsed waveform electric welding current is preferably varied or changed algorithmically in response to the detected welding arc voltage/current changes.

The method steps and apparatus of the present invention are especially effective in applications where it is desired to advantageously use welding wire filler material in relatively small or fine wire-diameter sizes such as from approximately 0.005 inch diameter to 0.018 inch diameter as the advancing welding electrode.

Additional details of the present invention are provided in the drawings and in the descriptions and claims which follow.

DESCRIPTION OF THE DRAWINGS

FIG. 7 is a schematic top-plan view, partially in section, of a welding torch assembly preferred for utilization in the apparatus of FIG. 1;

FIG. 8 is a side-elevation view, partially in section, of the torch assembly illustrated in FIG. 7.

DETAILED DESCRIPTION

Figure 1:
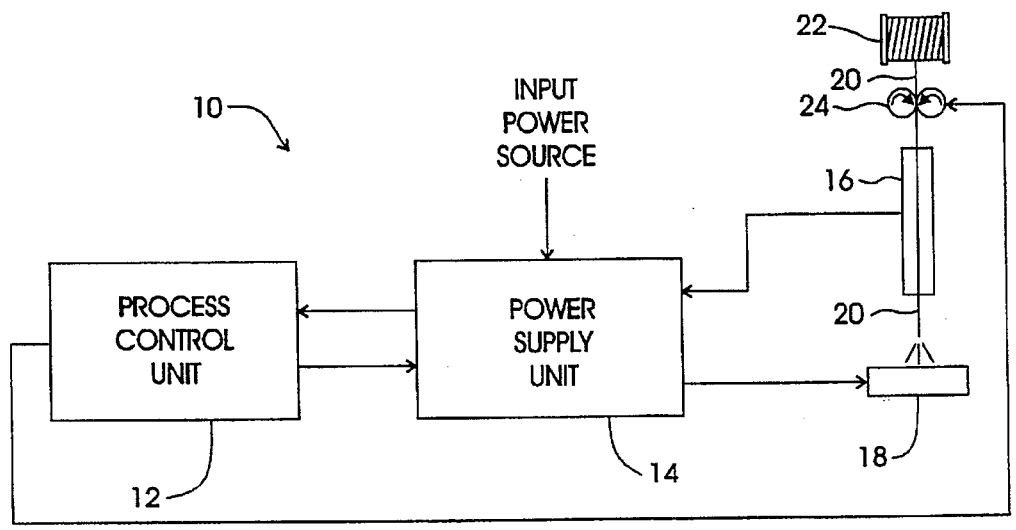
FIG. 1 is a schematic diagram of an embodiment of an electric arc welding system preferred for the practice of the present invention.

As illustrated in FIG. 1, the preferred embodiment of the welding system 10 in which the present inventions are incorporated and utilized includes a welding process controller unit 12 and a co-operating power supply unit 14. Such units co-operate electrically with a welding torch assembly 16 and a metal workpiece 18 to which molten weld filler material from welding wire 20 is to be transferred. Welding wire 20 is initially contained on wire spool 22 and is fed to and through welding torch assembly 16 by cooperation with the pair of wire drive rolls designated 24. Although not illustrated in FIG. 1, a supply of inert gas is preferably provided in welding system 10 and is flowed to and through torch assembly 16 to establish a protective environment which shields the molten end of welding wire 20 and the adjacent welding site area of workpiece 18 from atmospheric oxygen and atmospheric nitrogen.

Even though not illustrated in FIG. 1, process controller unit 12 typically includes various operator-controlled or operator-monitored on/off switches, status lights, process parameter input command devices, process parameter performance status instruments, and other generally similar devices, along with the necessary internal circuitry, for operator use in achieving satisfactory manual control of system 10. The indicated input power source is generally a commercially available source of alternating current electric energy (e.g., 230 volt, 60 Hertz, 1-phase electric utility power); a direct current electric power source such as a conventional storage battery also may serve as the system 10 input power source.

Generally, apparatus 10 functions with output electric current pulse group repetition frequencies in the approximate range of from 20 Hertz to 5 kilohertz, with 500 Hertz to 2 kilohertz now being preferred for most equipment applications. The output electric welding current squared pulse group waveform conducted to workpiece 18 may have a maximum or peak (high-level) amplitude that varies from as little as 0.1 ampere to as much as approximately 2,000 amperes; however, pulse high-level current values in the range of approximately 200 to 500 amperes presently are preferred. Also, it is presently preferred that the pulsed electric current be switched in apparatus 10 between pulse high and low current values with current rise/fall rates in the approximate range of from 10 kiloamperes per millisecond to 200 kiloamperes per millisecond with approximately 150 kiloamperes per second presently being preferred. Such is presently believed to be attainable only through use of a power supply having the capability of the type of pulse width modulated power regulator 28 illustrated schematically in FIG. 5, and clearly not through use of the commonly utilized conventional inverter-type welding power supply.

Further, the repeated current pulse groups utilized in the practice of the present invention typically have pulse group maximum voltages which are in the range of approximately 8 volts (D.C.) to 30 volts (D.C.). Also, it is important to note that power supply unit 14 is a high-frequency type power supply which functions with an operating frequency in the range of approximately from 100 kilohertz to 500 kilohertz to achieve clean welding current squared waveform characteristics and a satisfactory level of output response. In terms of available power supply components, a power supply 14 with an operating frequency of approximately 250 kilohertz presently is preferred.

Figure 2:
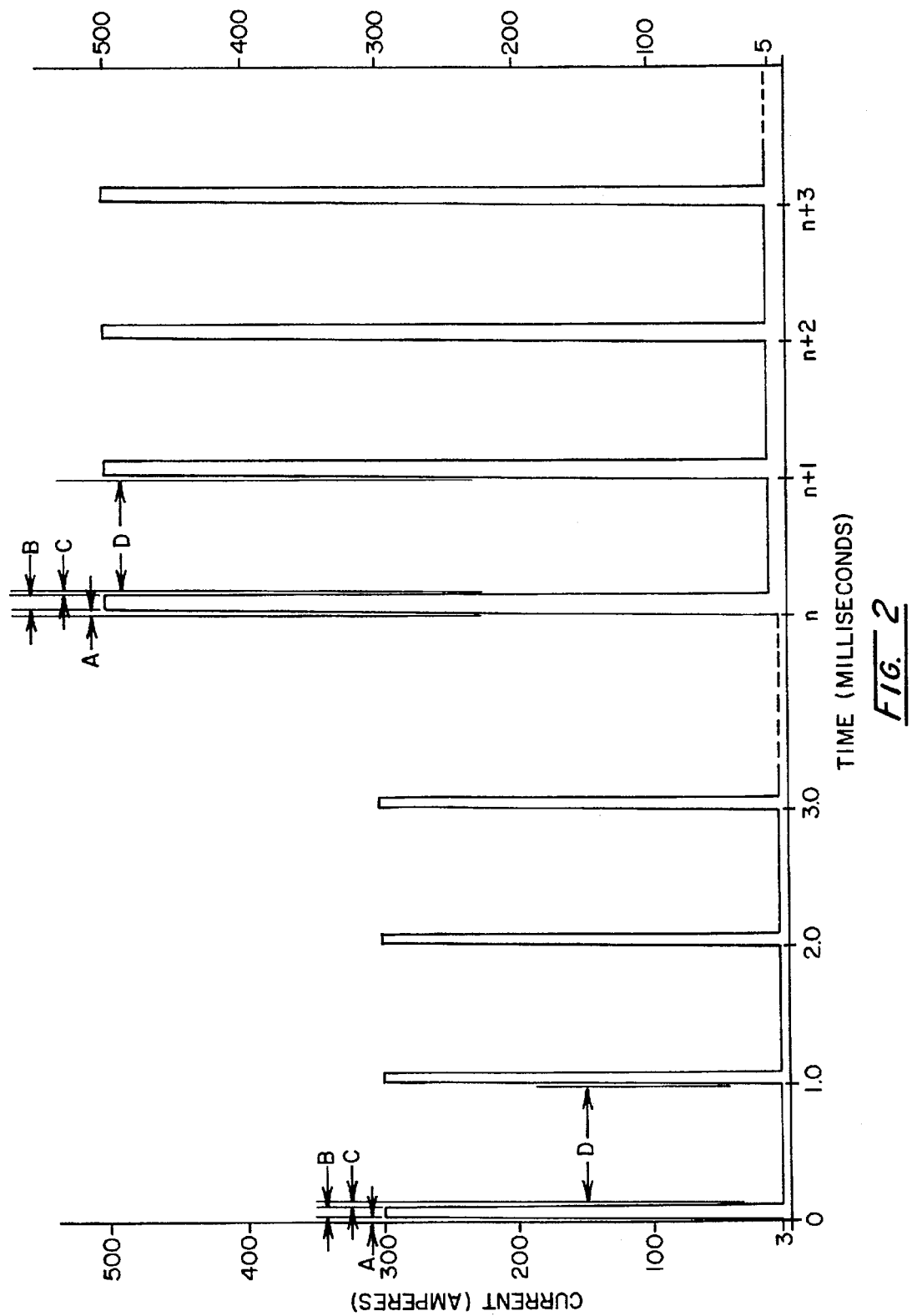
FIG. 2 is a schematic diagram illustrating representative electric welding current waveform pulse groups of the unique pulsed electric welding current generated by and utilized in the apparatus of FIG. 1.

FIG. 2 schematically illustrates representative time-amplitude waveforms of the pulsed electric current conducted from power supply unit 14 and to and through metal workpiece 18 and welding wire electrode 20. As an illustrative case, a current pulse group repetition frequency of 1,000 Hertz is utilized, resulting in a pulse group repetition period of 1.0 milliseconds. All pulse groups preferably have group rise/fall times not greater than 0.1 millisecond, and preferably to as little as 0.02 millisecond, between the illustrated welding current pulse group peak high and low current amplitudes. For the initial waveforms of FIG. 2, the high welding current pulse group peak amplitude is approximately 300 amperes and the low welding current pulse group peak amplitude is approximately 3 amperes. The peak amplitudes are relatively stable over the pulse group durations. With achieved pulse current rise and fall rates of approximately 150 kiloamperes per millisecond, the corresponding pulse rise and fall times are significantly less than 0.1 milliseconds and typically are about 0.02 milliseconds in duration. The initial current waveform pulse groups are illustrated as each having pulse total time durations of approximately 0.05 milliseconds at the peak high current amplitude and thus each high-amplitude current pulse exists at the high amplitude, exclusive of 0.02 millisecond rise time and 0.02 millisecond fall time, throughout about 5% of the pulse group repetition period.

Referring to FIG. 2 again, the time durations designated A are welding current pulse rise times or durations, the time durations designated B are time durations at the high welding current amplitude, the time durations designated C are welding current pulse fall times or durations, and the time durations designated as D are time durations of the pulses at the welding current low amplitudes.

It should be noted that the ratio of the peak amplitudes of high-amplitude welding current pulse groups to peak amplitude of the low-amplitude welding current pulse groups of the initial pulse groups is approximately 100:1 in the FIG. 2 illustration. For the practice of the present invention we prefer that ratio be generally in the range of from approximately 10:1 to approximately 500:1 and is selected in a particular application largely on the basis of the pulse group repetition frequency being utilized. Also, the time duration or pulse group width of each high-amplitude current pulse group should be less than approximately one-fifth (20%) the time duration or pulse group width of each low-amplitude current pulse group. In the case of the illustrated initial welding current pulse groups of FIG. 2, the high-amplitude current pulse groups each have a time duration that is about 5% (1/20th) the duration of each low-amplitude current pulse group.

FIG. 2 further illustrates the pulsed electric current waveform following pulse group width and pulse group amplitude modulation of the pulsed electric current conducted to workpiece by the operation of power supply unit 14 for the 1,000 kilohertz pulse group repetition frequency case. The four additional waveforms are illustrated as being modulated to a condition whereat the individual pulse time durations at a relatively stable peak or maximum current amplitude of approximately 500 amperes are approximately 0.1 millisecond or 10% of the pulse repetition period of 1.0 millisecond. The low-amplitude current pulse groups in the case of the four additional waveforms are at a current amplitude of approximately 5 amperes and thus have the same 100:1 ratio between high and low current amplitudes as the case of the illustrated three initial waveforms.

Also, apparatus 10 may be also characterized as having pulse switching response (rise/fall) times, welding current pulse repetition frequencies, and waveform shape squarings which are independent of the amplitudes of the pulsed welding current. Also, and in terms of available apparatus components, we desire and are able to stabilize the amplitudes of the welding current pulses to a tolerance of +/− 0.25% throughout their durations at peak value.

Figure 3:
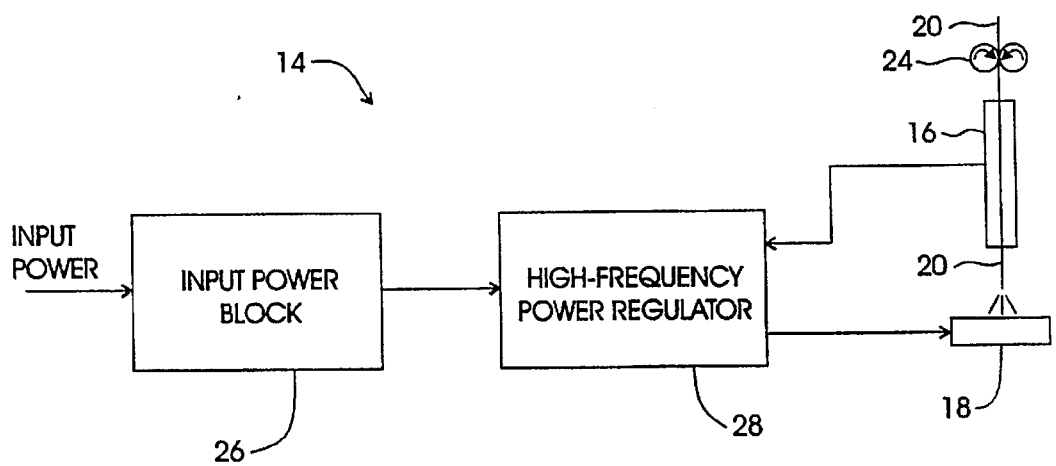
FIG. 3 is a schematic diagram indicating the basic functional sections of the power supply unit included in the system apparatus of FIG. 1.
Figure 4:
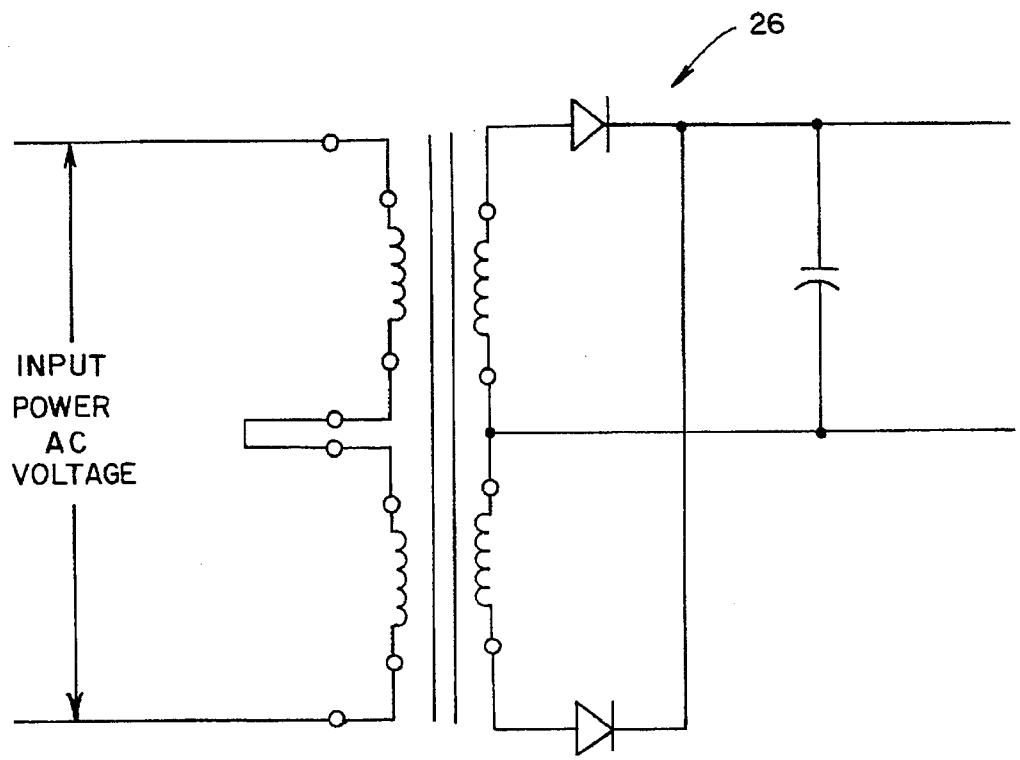
FIG. 4 is a schematic circuit diagram of one form of input power block section for the FIG. 3 power supply unit.
Figure 5:
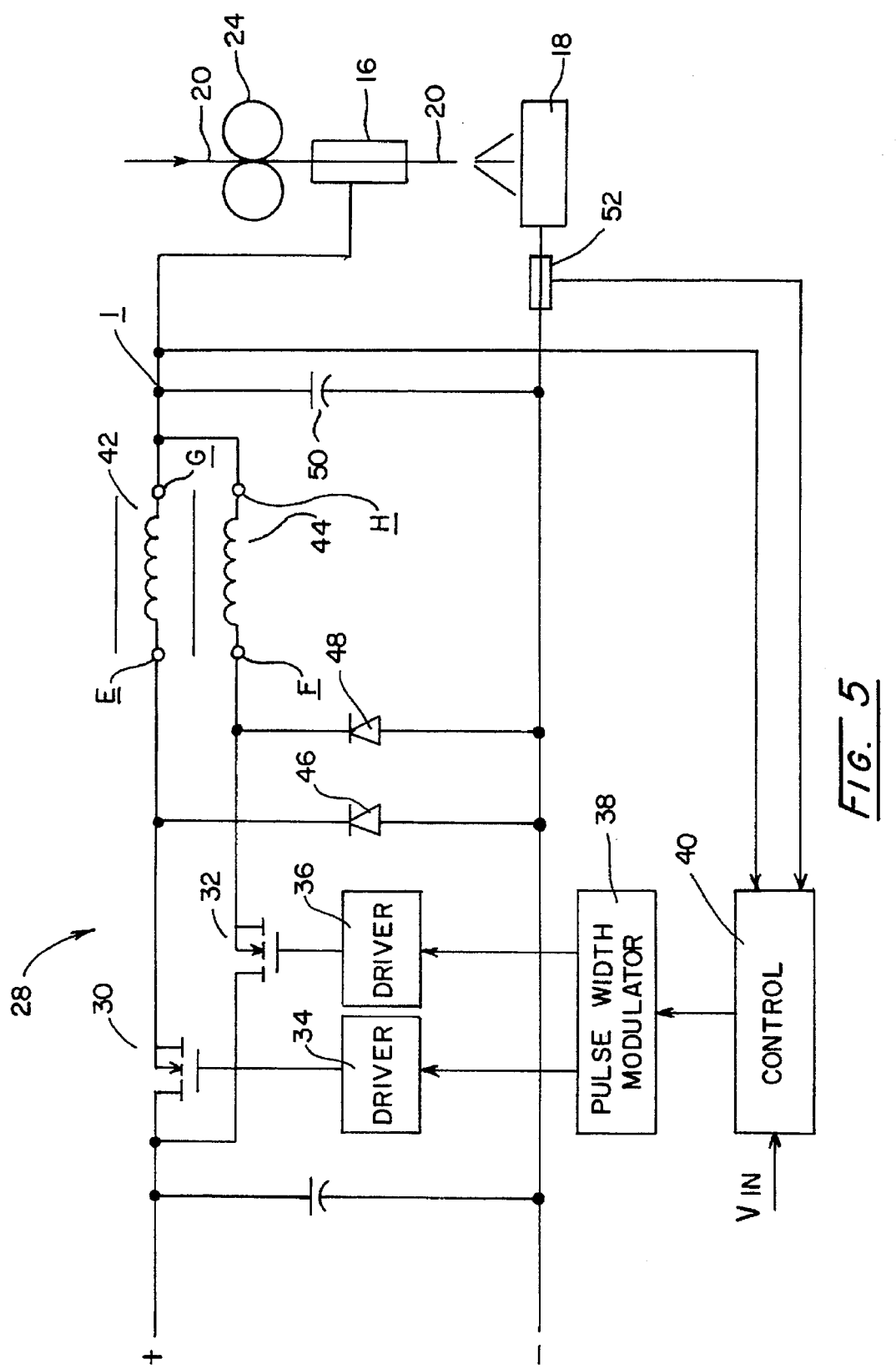
FIG. 5 is a schematic circuit diagram of the high-frequency power regulator section of the FIG. 3 power supply unit.

Apparatus for generating and controlling the pulsed electric current required for practice of the present invention is illustrated schematically in FIGS. 3 through 5 of the drawings. In FIG. 3 the FIG. 1 power supply unit 14 is shown as basically being comprised of an input power block section 26 and a high-frequency power regulator section 28 that co-operate with welding system elements 18 through 24. The input power to block 26 may be either alternating current electric power or direct current electric power. However, the circuitry illustrated schematically in FIG. 4 is for the alternating current input power case.

As illustrated in FIG. 4, input power block section 26 is essentially a full-wave rectifier circuit comprised of conventional transformer, rectifier diode, and capacitor components. The power input voltage to the transformer component may be a single-phase voltage derived from a conventional 230 volt, 60 Hertz, 3-phase utility power source, for example.

FIG. 5 schematically illustrates one form of circuitry preferred for high-frequency power regulator section 28. As shown in that Figure, apparatus section 28 is basically comprised of transistorized high-current switches 30 and 32, respective switch drivers 34 and 36, and the co-operating pulse-width modulator 38 with its attendant control 40. The pulse-width modulator 38 and control 40 combination typically include saw-tooth oscillator, error signal amplifier, pulse-width modulator, low-impedance driver, and applicable logic sub-circuits. Such function in part as a closed control loop that receives an analog input reference or command voltage from process control unit 12 in response to operator inputs and that also receives input feedback signals representative of the output voltage amplitude and the output current amplitude of the pulsed electric current conducted through workpiece 18 and welding wire electrode 20. The current amplitude feedback signal is obtained from shunt or Hall-effect device 52. The voltage amplitude feedback signal is a measure of the welding arc voltage, that is, the voltage between workpiece 18 and welding wire electrode 20.

High-frequency power regulator 28, in addition to the above-summarized circuitry, also includes high-frequency filter sub-circuits comprised of line coils (inductances) 42 and 44, fast, soft-recovery-type, free-wheeling diodes 46 and 48, and capacitor 50. Coils 42 and 44, and their respectively co-operating driver, switch, diode, and capacitor circuit components, each develop one or the other of the system welding current pulsed high and low current amplitudes in response to control by pulse width modulator 38 and its co-operating control 40. It should be noted that the logic sub-circuits in the pulse width modulator/control 38,40 are essentially an implementation of a welding process control algorithm whereby process high-amplitude pulse group current amplitudes, low-amplitude pulse group current amplitudes, high-amplitude current pulse group time durations, low-amplitude current pulse group time durations, current pulse group ramp-up rates, and current pulse group ramp-down rates are particularly regulated in response to detected welding arc voltage/current changes. Also, and although not illustrated in the drawings, the process welding wire feed speed parameter input to process control unit 12 is utilized as a parameter input to the algorithmic control developed by the logic sub-circuits of control 40. The invention's pulse-width modulating feedback control in an electric arc welding process utilizing a small-diameter welding wire electrode (e.g., less than approximately 0.025 inch diameter) in combination with the pulsed high-frequency electric current specified herein results in a significantly shorter electric arc length and consequentially increased electric arc stability. In the case of the present invention the shortened arc length is approximately from 30% to 50% of that of an otherwise conventional and comparable electric arc welding process operating in a spray-transfer mode.

Figure 6:
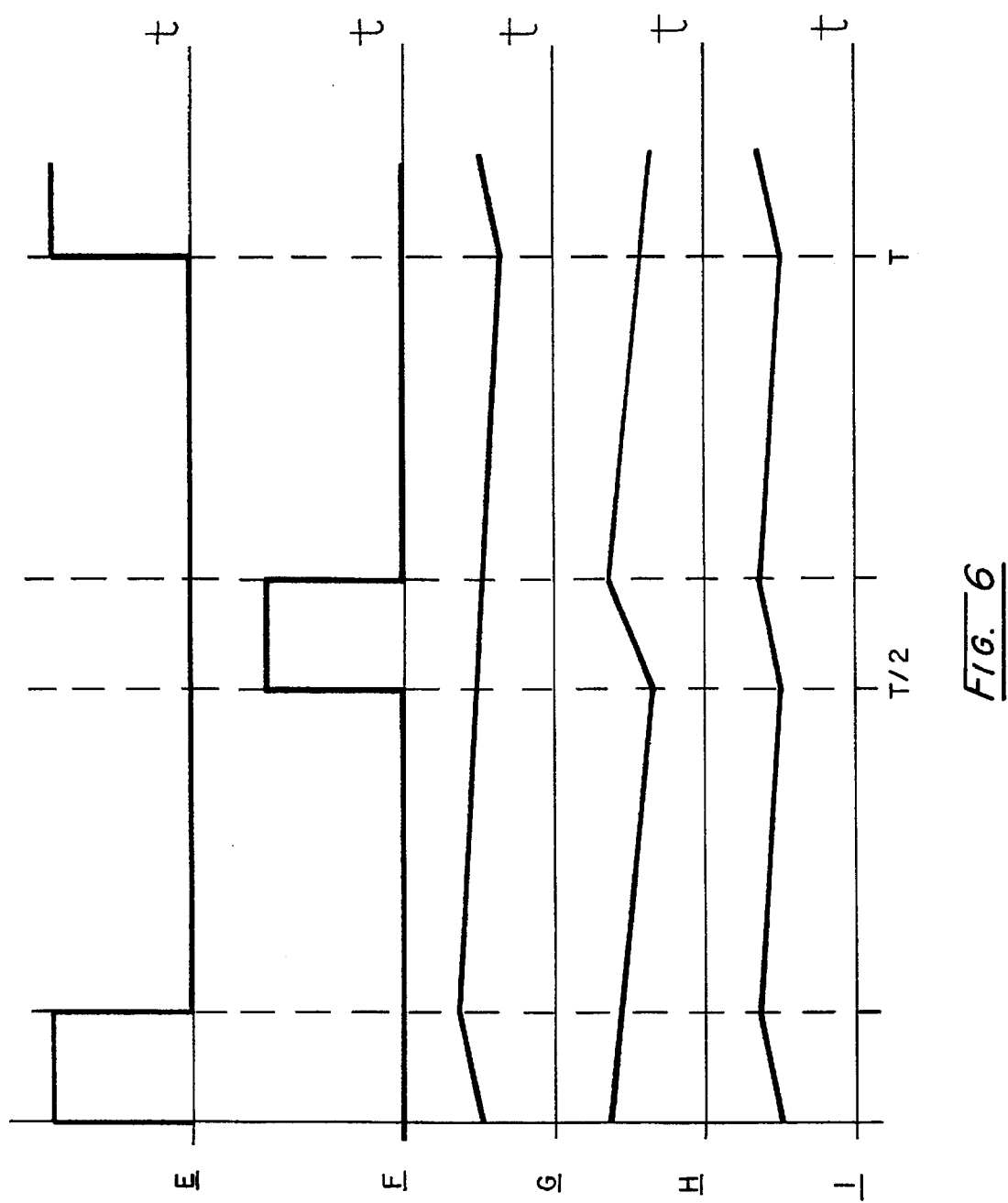
FIG. 6 illustrates voltage and current amplitude waveforms associated with the operation of the circuitry of FIG. 5.

In FIG. 6 of the drawings we provide typical voltage amplitude and current amplitude waveforms E through I which are developed in the operation of the schematic circuit of FIG. 5. Waveforms E and F are voltage waveforms and waveforms G through I are current waveforms, each waveform being associated with a respectively referenced point in the circuitry of FIG. 5.

To obtain optimum performance in the operation of welding system 10, and particularly in applications involving the use of small-diameter welding wire filler material (e.g., 0.008 inch diameter to 0.015 inch diameter welding wires), it is important to have close responsive control over the feed rate of the continuously advancing welding wire electrode when it is being fed into the welding arc. Accordingly, we have provided a torch assembly 16 or the equipment with a novel welding wire feeder which has minimum operational mass momentum and mass inertia to thereby enable the achievement of optimum responsive use of the pulsed electric current generated and controlled by high-frequency power regulator 28. Details of the torch assembly 16, including details of the improved welding wire feeder, are provided in FIGS. 7 through 9 of the drawings.

In torch assembly 16 the novel welding wire feeder is comprised of a pair of individually driven pinch drive rolls 60 and 62 which are each coupled to the drive shaft of a respective separate and very small drive motor 64 and 66 that is controlled as to rate of rotation by the process controller unit 12 of system (See FIG. 1). Paired drive motors 64 and 66 are generally selected from the group comprised of stepper motors, alternating current (A.C.) motors, and direct current (D.C.) motors. If of the stepper motor type, such typically have an over-all diameter in the range from one-half inch to one and one-half inch, often index rotationally from 1.8 to 7.5 degrees per full step, and accordingly have a very low degree of rotational inertia and momentum when actuated. If paired drive motors 64 and 66 are direct current motors, they have the same overall diameter range and incorporate tachometer and/or encoder feedback mechanisms for accurate control of desired wirefeed speed. If, on the other hand, paired drive motors 64 and 66 are alternating current motors, they have the same overall diameter range and incorporate Hall-effect devices, tachometers and/or encoder feedback mechanisms for accurate control of desired wirefeed speed.

Figure 9:
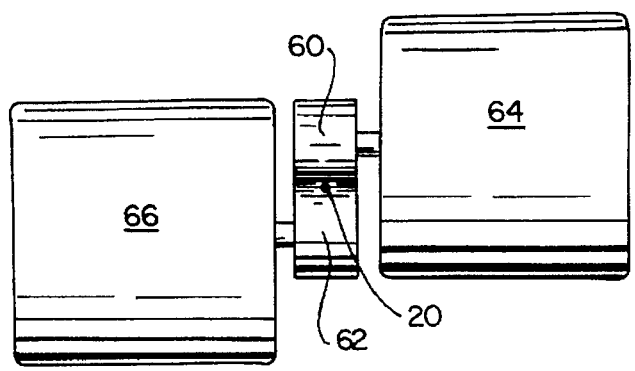
FIG. 9 is a torch assembly schematic cross section view taken at line 9—9 of FIG. 7 to illustrate the end elevation positioning relationship of the welding wire drive roll and drive roll motor elements included in the welding torch assembly.

As shown in FIGS. 8 and 9, the strand of welding wire 20 contained in supply cartridge assembly 80 passes through the nip formed between rolls 60 and 62 and is frictionally driven by those rolls through the aligned welding wire passageways 68 provided in guide tube elements 70 and 72. Friction drive rolls 60 and 62 are typically of small diameter (e.g., 0.1 inch diameter to 0.5 inch diameter) and, depending on the type of welding wire used, may be fabricated of a conventional organic polymer, carbide, or steel/stainless steel materials. Drive roll elements 60 and 62 are rotated in FIG. 8 in clockwise and counter-clockwise directions, respectively, to advance welding wire 20 toward and through replaceable welding tip 100. Generally, apparatus 10 functions to advance welding wire 20 in applications involving small-diameter welding wires at a feed rate in the range of from approximately 10 inches per minute to approximately 1,500 inches per minute. Spring means for yieldably biasing roll elements 60 and 62 (and their respective drive motors 64 and 66) into engagement with each other are normally provided in torch assembly 16 but are not illustrated in the drawings.

The herein described electric arc welding methods and welding apparatus may be especially advantageously utilized in the welding of thin metal sheet materials (e.g., to as little as 0.008 inch thickness) to avoid melt-through holes, in the welding of metal sheet and plate materials over 1/16 inch in thickness to minimize weld penetration, in welding to minimize the heat-affected zone under the weld and thereby minimize compositional degradation, and in welding to minimize the tendency toward heat-affected zone microcracking as in the case of high-temperature nickel-based and cobalt-based superalloys used in the manufacture of gas turbine engines. Also, the inventive methods and apparatus offer advantages when utilized to weld both small and relatively thin metal assemblies without concurrent warpage or physical distortion, and to weld together more different-metal material combinations from the group comprised of the alloys of copper, steel, stainless steel, silver, nickel, and cobalt.

For instance, when utilizing the methods and apparatus disclosed in this application with a welding wire electrodes having a nominal wire diameter in the range of from 0.005 to 0.018 inches we are able to limit the heat-affected zone under the weld to a depth of less than 0.015 inch from the weld metal to the unaffected base metal as determined by examination of applicable metallurgical microphotographs.

Various changes may be made to the process steps, apparatus components, and materials described above without departing from the invention which we claim.

We claim our invention as follows:

1. In an electric arc welding method of melting and spray-transferring filler material from a continuously advancing welding wire electrode for weld-bonding to a metal workpiece, the steps of:

locating a welding wire electrode having a diameter less than approximately 0.025 inch in proximity to the metal workpiece;

conducting a pulsed electric energy current comprised of squared waveform high-amplitude pulses alternated with squared waveform low-amplitude pulses through the welding wire electrode and through the metal workpiece to thereby form a welding electric arc; and utilizing detected voltage and current amplitude changes in said pulsed high-frequency electric energy current in a feedback control mode to effect variations in pulse peak current amplitudes, time durations, and ramp-up and ramp-down current change rates of said pulsed electric energy current, and to effect consequential voltage and current stabilization in said electric welding arc, said pulsed electric current squared waveform high-amplitude current pulses having a peak current amplitude in the range of from approximately 10 times to 500 times the peak current amplitude of said squared waveform low-amplitude current pulses, having alternated current pulses with a pulse repetition frequency in the range of from approximately 20 Hertz to approximately 5 kilohertz, having pulse current amplitude rise and fall rates between said high-amplitude current pulses and said low-amplitude current pulses in the approximate range of 10 kiloamperes per millisecond to 150 kiloamperes per millisecond, having high-amplitude current pulses with a stable peak current amplitude in the range of from approximately 0.1 ampere to approximately 2,000 amperes, and having high-amplitude current pulses each with a time duration at peak current amplitude that is less than approximately 1/5 the duration of each alternated low-amplitude current pulse.

2. The electric arc welding method invention defined by claim 1 wherein said high-amplitude current pulse groups and said low-amplitude current pulse groups each have a pulse group repetition frequency in the range of from approximately 500 Hertz to approximately 2 kilohertz.

3. The electric arc welding method invention defined by claim 1 wherein said high-amplitude current pulse groups have a stable peak current amplitude in the range of from approximately 20 amperes to approximately 500 amperes.

4. The electric arc welding method invention defined by claim 1 wherein said pulsed high-frequency electric energy current has pulse group rise and fall times between said high-amplitude current pulse groups and said low-amplitude current pulse groups which are approximately 0.02 millisecond.

5. In an electric arc welding method of melting and spray-transferring filler material from a continuously advancing welding wire electrode for weld-bonding to a metal workpiece, the steps of:

locating a welding wire electrode having a cross-sectional diameter less than approximately 0.025 inch in proximity to the metal workpiece;

conducting a high-frequency electric energy current comprised of squared waveform high-amplitude current pulses alternated with squared waveform low-amplitude current pulses through said welding wire electrode and through the metal workpiece to thereby form a welding electric arc;

detecting changes in the voltage and current condition of the formed welding electric arc; and varying the ramp-up and ramp-down current change rates, time durations, and current amplitudes of said high-amplitude current pulses and said low-amplitude current pulses responsive to said detected changes in welding electric arc voltage and current condition, said pulsed high-frequency electric energy current having squared waveform high-amplitude current pulses with a peak current amplitude that is in the approximate range of from 10 times to 500 times the peak current amplitude of said low-amplitude current pulses, having current pulses with a pulse repetition frequency in the range of from approximately 20 Hertz to approximately 5 kilohertz, having pulse current amplitude rise and fall rates between said high-amplitude current pulses and said low-amplitude current pulses in the range of approximately 10 kiloamperes per millisecond to approximately 150 kiloamperes per millisecond, having high-amplitude current pulses with a peak current amplitude in the range of from approximately 0.1 ampere to approximately 2,000 amperes, and having high-amplitude current pulses each with a time duration at peak current amplitude that is less than approximately ⅕ the duration of each alternated low-amplitude current pulse.

6. The electric arc welding method invention defined by claim 5 wherein said pulsed high-frequency electric energy current squared waveform high-amplitude current pulse groups and squared waveform low-amplitude current pulsegroups have a pulse group repetition frequency in the range of from approximately 20 Hertz to approximately 5 kilohertz, said pulse repetition frequency being varied in response to said detected changes in welding electric arc voltage and current condition.

7. The electric arc welding method invention defined by claim 5 wherein said pulsed high-frequency electric energy current squared waveform high-amplitude current pulse groups and squared waveform low-amplitude current pulse groups have a pulse group repetition frequency in the range of from approximately 500 Hertz to 2 kilohertz, said pulse group repetition frequency being varied within said range in response to said detected changes in welding electric arc voltage and current condition.

8. The electric arc welding method invention defined by claim 5 wherein said pulsed high-frequency electric energy squared waveform high-amplitude current pulse groups have a stable peak current amplitude in the range of from approximately 0.1 ampere to approximately 2,000 amperes, said stable peak current amplitude being varied within said range in response to said detected changes in welding electric arc voltage and current condition.

9. The electric arc welding method invention defined by claim 5 wherein said pulsed high-frequency electric energy squared waveform high-amplitude current pulse groups have a stable peak current amplitude in the range of from approximately 20 amperes to approximately 500 amperes, said stable peak current amplitude being varied within said range in response to said detected changes in welding electric arc voltage and current condition.

10. The electric arc welding method invention defined by claim 5 wherein said pulsed high-frequency electric energy current has pulse group rise and fall time durations between said squared waveform high-amplitude current pulse groups and low-amplitude current pulse groups which are varied in response to said detected changes in welding electric arc voltage and current condition.

11. The electric arc welding method invention defined by claim 5 wherein each said high-amplitude current pulse group has a time duration at peak amplitude that is less than approximately ⅕ the time duration of each said low-amplitude current pulse group.

12. In a high-frequency electrical energy power supply of an electric arc welding system that melts and spray-transfers filler material from a continuously advancing small-diameter welding wire electrode for weld-bonding to a metal workpiece, high-frequency power regulator means comprising, in combination:

first circuit means generating a high-frequency electric current pulsed at a frequency in the approximate range of from 100 kilohertz to 500 kilohertz and comprised of squared waveform high-amplitude current pulse groups alternated with squared waveform low-amplitude current pulse groups and that is conducted between the system welding wire electrode and metal workpiece as a welding electric arc;

second circuit means detecting changes in the voltage and current of said welding electric arc;

third circuit means that in a feedback control mode of operation varies the time durations, ramp-up and ramp-down current change rates, and peak current amplitudes of said first circuit means high-frequency electric current high-amplitude current pulse groups and said first circuit means high-frequency electric current low-amplitude current pulse groups in response to electric arc voltage and current changes detected by said second circuit means, the ratio of the peak current amplitude of said first circuit means pulsed high-frequency electric energy current squared waveform high-amplitude current pulse groups to the peak current amplitude of said first circuit means pulsed high-frequency electric energy current squared waveform low-amplitude pulse groups being in the approximate range of 10:1 to 500:1.

13. The apparatus invention defined by claim 12 wherein said first circuit means generates a pulsed high-frequency electric energy current with squared waveform pulse groups that have a pulse group repetition frequency in the range of from approximately 20 Hertz to 5 kilohertz, and wherein said third circuit means additionally algorithmically varies said pulse group repetition frequency in response to welding electric arc voltage/current condition changes detected by said second circuit means.

14. The apparatus invention defined by claim 12 wherein said first circuit means generates a pulsed high-frequency electric energy current with squared waveform current pulse groups that have a pulse group repetition frequency in the range of from approximately 500 Hertz to 2 kilohertz, and wherein said third circuit means additionally varies said pulse group repetition frequency in response to welding electric arc voltage and current condition changes detected by said second circuit means.

15. The apparatus invention defined by claim 12 wherein said first circuit means generates a pulsed high-frequency electric energy current with squared waveform current pulse groups that have a high-amplitude current pulse stable peak amplitude that is in the range of from approximately 0.1 ampere to approximately 2,000 amperes, and wherein said third circuit means additionally varies said high-amplitude current pulse group stable peak amplitude in response to welding electric arc voltage and current condition changes detected by said second circuit means.

16. The apparatus invention defined by claim 12 wherein said first circuit means generates a pulsed high-frequency electric energy current with squared waveform current pulse groups that have high-amplitude current pulse stable peak amplitudes that are in the range of from approximately 20 amperes to approximately 500 amperes, and wherein said third circuit means additionally varies said high-amplitude current pulse peak amplitudes in response to welding electric arc voltage and current condition changes detected by said second circuit means.

17. The apparatus invention defined by claim 12 wherein said first circuit means generates a pulsed high-frequency electric energy current with squared waveform current pulse groups that have rise and fall time durations between said first circuit means high-amplitude current pulse groups and said first circuit means low-amplitude current pulse groups that are less than approximately 0.1 millisecond, and wherein said third circuit means varies said rise/fall time durations in response to welding electric current arc voltage and current condition changes detected by said second circuit means.

18. The apparatus invention defined by claim 12 wherein said first circuit means generates a pulsed high-frequency electric energy current with squared waveform current pulse groups that have rise and fall time durations between said first circuit means high-amplitude current pulse groups and said first circuit means low-amplitude current pulse groups that are each approximately 0.02 millisecond, and wherein said third circuit means varies said rise and fall time durations in response to welding electric current arc voltage/current condition changes detected by said second circuit means.

19. The apparatus invention defined by claim 12 wherein said first circuit means generates a pulsed high-frequency electric energy current having high-amplitude current pulse groups with time durations at peak amplitude that are less than approximately ⅕ the time durations of said low-amplitude current pulse groups at peak low-current amplitudes.

* * * * *